United States Patent [19]
Oda et al.

[11] Patent Number: 4,696,789
[45] Date of Patent: Sep. 29, 1987

[54] NUCLEAR REACTOR POWER METER

[75] Inventors: Minoru Oda, Amagasaki; Kunio Oba, Kobe, both of Japan

[73] Assignee: Mitsubishi Denki Kabushiki Kaisha, Japan

[21] Appl. No.: 790,625

[22] Filed: Oct. 23, 1985

[30] Foreign Application Priority Data

Oct. 25, 1984 [JP]  Japan ................................ 59-223016

[51] Int. Cl.⁴ ............................................. G21C 17/00
[52] U.S. Cl. ...................................... 376/254; 376/259
[58] Field of Search ........................ 376/245, 254, 259

[56]         References Cited
        U.S. PATENT DOCUMENTS 3,819,936  6/1974  Weiss et al. ......................... 376/254
3,822,184  7/1974  Weiss ................................... 376/254

Primary Examiner—Salvatore Cangialosi
Attorney, Agent, or Firm—Leydig, Voit & Mayer

[57]             ABSTRACT

A nuclear reactor output power meter for measuring the output of a nuclear reactor from the concentration signal of radioisotope $^{16}N$ in a primary coolant loop, having a transient response correction circuit. This correction circuit includes an approximated normal distribution response filter. This filter has a group delay time substantially corresponding to a single circulation time necessary for the primary coolant loop of the nuclear reactor. This filter also has a rise time in the step response substantially corresponding to a spread in the rise time of the $^{16}N$ concentration signal due to agitation occurring during the single circulation time.

5 Claims, 14 Drawing Figures

I : BEFORE CORRECTION (DETECTOR OUTPUT)

II : AFTER CORRECTION (METER OUTPUT)

NUCLEAR REACTOR POWER METER

BACKGROUND OF THE INVENTION

The present invention relates generally to an output power meter for a nuclear reactor, and more particularly to an output power level measuring device for use with a light water reactor (LWR), which is specifically designed to measure the output power of a nuclear reactor by the detection of an immediate concentration of a radioisotope $^{16}N$ in the primary coolant of the reactor.

There is already known as disclosed in, for example, the Official Gazette of Japanese Patent Laid-open Application No. 47-13,600 corresponding to the U.S. patent application Ser. No. 102,617 filed on Dec. 30, 1970, a system for measuring the output of a nuclear reactor by way of the detection of the concentration of a radioisotope $^{16}N$ contained in the primary coolant of the reactor.

While this system of measuring a reactor output is generally quicker in response in comparison with the common thermal output measuring sytem, from which there is advantageously attainable a current measurement in direct proportion to the reactor core output, it is known that this method is not convenient, since an output response to a variation in a transient output of a nuclear reactor as shown in FIG. 1B resuls in a stepwise cumulation as shown by a curve in FIG. 1C. This is primarily because the primary cooling water to be measured is subjected in repetition to irradiation of the neutron, while circulating in the closed loop of a cooling system. As a consequence, in order to obtain a proper output response which is proportional to the current variation in the reactor output as a function of time, it is generally required to provide a compensatory operation for such a cumulation in the measuring response by using either an analog type electronic computing circuit or an electronic digital computer. Preferably, this compensative operation is to be conducted by way of the former analog type electronic computing circuit rather than by the latter electronic digital computer from the viewpoints of reliability and quickness in responses. As it is the practice that the reactor output meters are generally incorporated in a safeguard system of a reactor, it is highly desirable to employ the analog type electronic computing circuit rather than the use of the electronic digital computer, accordingly.

However, in consideration of the fact that the cumulative phenomenon in transient responses of the reactor output measuring system as reviewed hereinbefore in connection with FIG. 1 is from an intrinsic nature of process which reflects a pure delay time, it would then be difficult to compensate for the cumulative phenomenon without the use of an electronic digital computer. This comes true with the use of the electronic computing circuit of analog type in the prior art noted above, namely the accuracy of compensation for such a cumulative phenomenon turns out to be deficient, after all.

Next, FIG. 2 shows, by way of one example of the prior art, a result of compensation, in which curve 1 represents a state of responses in measurement of a reactor output prior to a compensatory operation, and curve II represents a state of responses after a due compensation therefor. As appreciated from the curve II, there is seen left still an error of 10% or more in the response to the reactor output measurement, which means an obvious deficiency in accuracy as for a reactor output meter, accordingly.

Now, this cumulative phenomenon in transient responses to a current measurement of variations in the reactor output will be reviewed in further detail in conjunction with FIG. 1. In FIG. 1A, there are shown a nuclear reactor designated by reference numeral 1, a steam generator by 2, a gamma ($\gamma$) ray detector by 3, a reactor core by 4, and a primary coolant loop by 5 in which a primary cooling water circulates.

There is generated radioisotope $^{16}N$ when the primary cooling water is subjected to the irradiation of neutrons while circulating in the area of the core 4 of the nuclear reactor 1, which radiates the gamma rays. Thus generated $^{16}N$ is then carried along with the circulation of the cooling water, and then is measured for its concentration by the gamma ray detector 3 mounted on a delivery piping (not shown) at the outlet of the reactor core 4. In general, it is known that a typical time of circulation of the primary cooling water through the primary coolant loop 5 is approxiately 10 sec. in the case of a typical pressurized water reactor (hereinafter, referred to as "PWR"). Also it is known that the half life of $^{16}N$ is approximately 7 sec. Therefore, at the moment that the primary cooling water returns back to the reactor core 4 after it is once subjected to the irradiation of the neutrons in the reactor core 4 and after the circulation throughout the cooling loop, the quantity of $^{16}N$ generated last will be left by approximately 35% thereof. With repetition of this process of circulation, a change in the concentration of $^{16}N$ with respect to a stepwise variation in the reactor power level as shown in FIG. 1B would, as reviewed generally hereinbefore, exhibit cyclically a stepwise cumulation converging towards a stationary value as typically shown in FIG. 1C. The wve form as observed at each of the rise portions of this stepwise ascending curve has a spread which is attributed to a period of time that the primary cooling water passes through the reactor core and a spread which is attributed to the effect of agitation of the cooling water caused during a number of circulations through the cooling loop. Further to this aspect, reference will then be made to FIG. 3.

When there occurs a momentary change or increase in the output of a nuclear reactor (at time $t=0$ as shown in FIGS. 3B and 3D, there is observed a change in the concentration of $^{16}N$ at this moment between both upstream and downstream portions of the cooling water currently existing in the area of reactor core 4. When this boundary of change in concentration of $^{16}N$ is passed in front of the gamma ray detector 3 by the flow of cooling water, the output signal of this gamma ray detector 3 may change or increase stepwise (as, for instance, shown at time $T_1$ shown in FIGS. 3D and 3E, respectively). It is to be noted that this boundary is initially spread to a certain extent of time according to the size of the reactor core 4, and as the cooling water flows along the primary coolant loop 5, this extent of spread would gradually further grow owing to the effect of the turbulence around the current boundary as encountered during the circulation through the coolant loop. This spread of boundary may appear as a rise time in the output signal of the gamma ray detector 3 as shown in FIG. 3E. When this boundary passes in front of the gamma ray detector 3 and arrives again this gamma ray detector 3 after having circulated once the entire primary coolant loop 5 at the time of $(t=T_1+T_2)$, it is observable that the current rise time would turn to be longer than the last one under the effect of agitation of the cooling water recirculating through the coolant piping, and also that the increment of the rise may be reduced owing to the attenuation of $^{16}N$ according to its half-life. Among these two aspects of spread of boundary (the rise time in responses) owing to two different causes as noted above, the one owing to the size of the reactor core 4 would depend upon the distribution of the output of the core 4 of the nuclear reactor 1, and the spread configuration would exhibit nearly the normal distribution. The other owing to the effect of agitation rendered by the cooling water during the passing thereof through the piping is of the phenomenon of diffusion given by the turbulent flow, and consequently, the spread configuration thereof may turn out to be the normal distribution.

Also, it is observed that the configuration of each rising portion of the stepwise curve shown in FIG. 3E is obtained from the condition of the above various factors, and that that of the one owing to the effect of agitation of the cooling water is obtained from the convolution corresponding to the number of the circulation in the coolant loop. Besides, as the input curve is of a step waveform, the configuration of each rise portion in FIG. 3E turns out to be nearly of an integral of normal distribution function (an error function).

Now, assuming that a spread of boundary owing to the passing through the reactor core 4 be SFc, a spread of boundary owing to the effect of agitation on the cooling water as observed after the reactor core 4 up to the point of the gamma ray detector 3 be $SF_1$, and a spread of boundary owing to the effect of agitation on the cooling water observed in the circulation through the entire coolant loop 5 be $SF_2$, the response as shown in FIG. 1C may be represented by the following equation. Here, the convolution is simplified by a symbol "$\oplus$". Also, equations may be represented with this symbolization in the following manner: that is, $$(A \oplus B) \oplus B = A \oplus B^2, A \oplus B^0 = A = A \oplus \delta(t) \quad (1)$$

$$S(t) = e^{-\lambda T_1} U(t - T_1) \oplus SFc \oplus SF_1 +$$
$$e^{-\lambda(T_1+T_2)} U(t - T_1 - T_2) \oplus SFc \oplus SF_1 \oplus SF_2 + \ldots +$$
$$e^{-\lambda\{T_1+(n-1)T_2\}} U\{t - T_1 - (n - 1)T_2\} \oplus SFc \oplus SF_1 \oplus SF_2^{n-1} + \ldots$$

where,
U(t): a unit step function
δ(t): a unit delta function
$T_1$: a time spent by the flow of the cooling water from the reactor core 4 to the gamma ray detector 3
$T_2$: a time required for the cooling water to circulate the entire primary coolant loop 5
λ: an attenuation coefficient of $^{16}N$ (approx. 0.1 $sec^{-1}$)

From the equation (1), a correction for the purpose of removing the stepwise cumulative aspect of responses to measurement may be given by the following equation. That is;

$$e^{\lambda T_1} S(t) \oplus \{\delta(t) - e^{-\lambda T_2} \delta(t - T_2) \oplus SF_2\} = U(t-T_1) \oplus SFc \oplus SF_1 \quad (2)$$

More specifically, substituting the equation (1) for the left member of the equation (2), there is obtained a response output with no term exhibiting any stepwise aspect in the right member of the equation (2). It should be noted that this correction is effective only for the removal of the questioned stepwise cumulation, but the terms $SF_1$ and SFc among the terms $SF_1$, $SF_2$ and SFc are left as they are. The present invention provides an improved nuclear reactor output power meter in accordance with this correction. In order to carry out this corrective arithmetic operation, it will be required to similate a pure delay time in this operation, so that it will be impractical to perform this operation by way of the aforementioned analog type electronic arithmetic circuit. Moreover, the configuration of the spread $SF_2$ is the left member of the equation (2) is not of a first order lag which can readily be realized by way of the analog electronic arithmetic circuit but of nearly the normal distribution function, and consequently, it is difficult to attain such a simulation by using the analog type electronic arithemtic circuit.

According to the conventional arrangement as noted above in connection with FIG. 2 for this correction system using such an analog type electronic arithmetic circuit, it employs a multi-cascade connection of first order lag elements as a delay element. However, since it remains unclear how to determine the number of the cascade connection, a certain number of the cascade connection has been set without any basis thereof, which may turn out to be a rather poor accuracy as reviewed hereinbefore in connection with the correction curve II of FIG. 2. More specifically, the curve I of FIG. 2 shows a step response of the $^{16}N$ detector 3 in a typical PWR plant while the curve II shows the result of the correction for the above response by means of such a correction as noted above. With this example, even when the number of the cascade connection of the first order lag element is somewhat increased, the accuracy of correction is insufficiently improved, which has been thought to be the inherent limit in the attainable response for this type of system.

In this respect, therefore, there have been two essential requirements in the conventional art for the correction of response in the measurement, that is the pure delay time and the normal distribution response, and since there are required an infinite number of circuit elements for meeting these two requirements by way of an analog type circuit, it has been difficult in practice to realize this concept.

SUMMARY OF THE INVENTION

It is therefore a primary object of the present invention to provide an improved nuclear reactor output meter which makes it possible in practice to provide an approximation with an extremely high accuracy for the attainment of such two requirements by the employment of a proper and finite number of analog circuit elements, instead of having these two essential requirements individually attained.

According to the present invention in an attempt to attain the object noted above, there is provided an improved nuclear reactor power meter for the measurement of a reactor output from an electrical signal relating to a current concentration of a radioisotope $^{16}N$ contained in a primary coolant in a primary coolant loop. This output meter broadly comprises a detector mounted at the outlet of the reactor for the detecting gamma rays radiated from the primary coolant flowing therethrough and a transient response correction circuit, responsive to the output of the detector, including an approximated normal distribution response filter having a group delay time substantially corresponding to a single circulation time necessary for the primary coolant loop and having a rise time in the step response substantially corresponding to a spread time in the rise of the $^{16}$N concentration signal due to agitation occurring during the single circulation time.

In accordance with one aspect of the invention, the approximated normal distribution response filter comprises multi-cascaded first order lag elements, the number of cascaded stages being substantially equal to $2\pi(t/t_{10-90})^2$ and the time constant of each of the first order lag elements being substantially equal to $\frac{1}{2}\pi(t^2_{10-90}/t)$ where the circulation time is t and the spread time is $t_{10-90}$. According to a second aspect of the invention, the approximated normal distribution response filter comprises a plurality of active filters, each having a characteristic intermediate between the Bessel type filter and the Butterworth type filter, having an overshooting characteristic of 1%–10% and having an intermediate output terminal providing a delay time of 60%–90% of the entire delay time. Further in accordance with this second aspect of the invention, the nuclear reactor power meter further comprises a differentiator having an input connected to the intermediate output terminal and means for subtracting the output of the differentiator from the output of the filter.

According to the invention, there is attained an advantageous effect such that in the factors of $\{\delta(t) - e^{-\lambda T_2}\delta(t-T_2) \oplus SF_2\}$ as found in the left member representative of removing the aspect of stepwise response in the corrective equation of transient response as per the equation (2) above; i.e., $$e^{\lambda T_1}S(t) \oplus \{\delta(t) - e^{-\lambda T_2}\delta(t-T_2) \oplus SF_2\} = U(t-T_1) \oplus SFc \oplus SF_1$$

the predetermined values of $T_2$ and $SF_2$ are subjected to correction in transient response for a group delay time and for a rise time of a step response of the approximated normal distribution response filter in the correction circuit, respectively.

BRIEF DESCRIPTION OF THE DRAWING

The above noted and further objects, features and advantages of the present invention will now become more apparent by reference to the following description of a preferred embodiment of the invention taken in conjunction with the accompanying drawings; in which.

DETAILED DESCRIPTION OF THE PREFERRED EMBODIMENTS

Figure 1A:
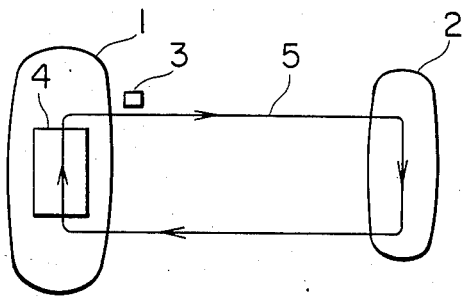
FIGS. 1A through 1C show a schematic diagram and graphic representations illustrating the principle of reactor output meter based on $^{16}$N measurement for use in a nuclear reactor.
Figure 1B:
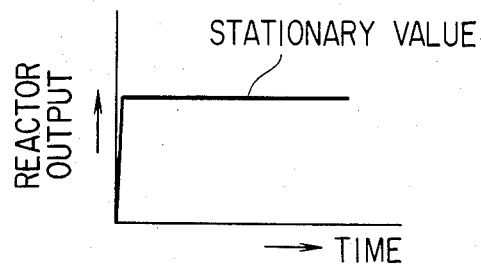
Figure 1C:
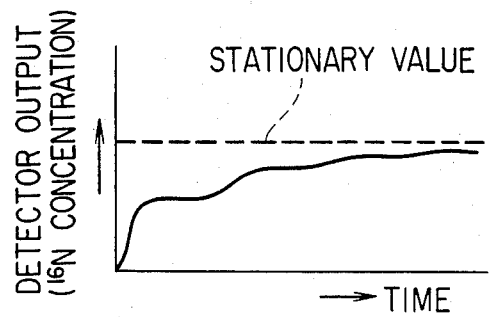
Figure 4:
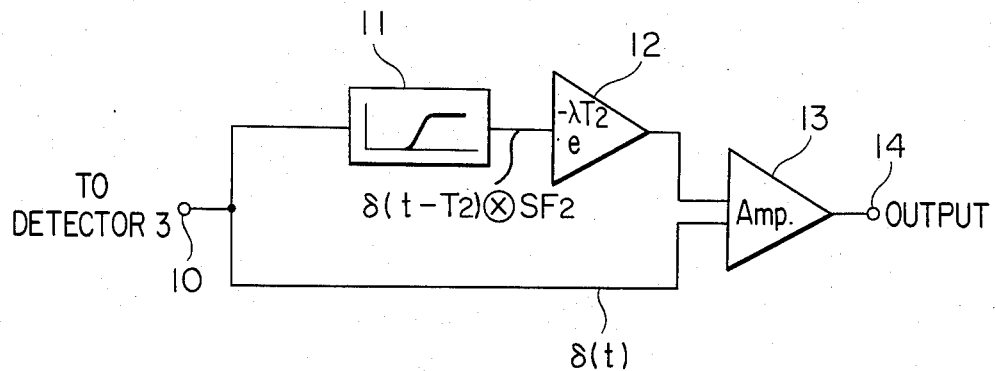
FIG. 4 shows a block diagram of an arrangement of one preferred embodiment of a transient response correction circuit for use in the $^{16}$N nuclear reactor output meter of the invention.

The present invention will now be described by way of one preferred embodiment thereof on a transient response correction circuit shown in FIG. 4 as being adapted in use to a nuclear reactor output meter. This correction circuit is adapted to be connected to the gamma ray detector 3 shown in FIGS. 1 and 3 or an amplifier adapted to amplify the output signal of the detector 3. The output of the correction circuit is to be used as an output of the entire reactor output meter. Referring to FIG. 4, there is shown a circuit having an input terminal designated by reference numeral 10 to be connected to the gamma ray detector 3, an approximated normal distribution response filter 11, amplifier elements 12 and 13, and an output terminal 14.

Firstly, it is to be noted that the operation of the correction circuit shown in FIG. 4 is based in principle on the equation (2) above, and that the function of the filter 11 is to produce both the group time delay and the approximated normal distribution response. There are presently available a variety of of approximated normal distribution response (analog) type fiters, among which the Bessel type or Thomson filters is well known as a typical one. It is generally known that this type of filter meets the requirement that there is no tendency of overshooting when adapted in a pulse transmission circuit, and is also called a linear phase type filter for its specific phase characteristic. Also, there are known ones which are designed to make use of the Benett's conversion method as the design principle that allows a certain level of ripples. Some of these linear phase type filters of high order exhibit characteristics having an impulse response approximating the normal distribution function, and also having time delays and rise times which are determined uniquely in accordance with the number of stages included in the cascade connection of the elements and their time constants, whereby they can be adapted for the present embodiment. It is to be noted that since this type filter per se has its own delay time and as far as this time, per se, is adjusted to the requirement, no other delay elements are needed. The amplifier 12 is adapted to simulate the operation of $e^{-\lambda T_2}$ (the value of attenuation rate of $^{16}$N observed during the circulation through the entire coolant loop) as in the equation (2) above, while the amplifier 13 is adapted to simulate the operation of $e^{-\lambda T_1}$ (the normalization coefficient of a gain).

It is to be noted that by selecting a specific time constant and number of stages (cascade connection) of the filter 11 in the practice of a specific construction as shown in FIG. 4, or more specifically by selecting them in conforming with desired values (that is, the values of $T_2$ and $SF_2$ in the equation (2)) for the specific construction of a power plant system, the present invention may provide a response correction circuit with an extremely high accuracy. As noted above, there exists only one combination of the specific values for the time constant and the number of stages for one given filter type, for instance, the Bessel type filter.

Next, there will be described an example of the approximated normal distribution type filter 11, in which optimal values of the time constant and the number of stages, may be determined, and then the accuracy of correction of the response correction circuit using this filter is to be pursued accordingly by way of similation using an electronic digital computer. As in the first example of the embodiment, the normal distribution response filter is approximated by a multi-cascaded connection.

While it is generally known that a multi-cascade connection of the first order lag elements may approximate the performance of the normal distribution response filter when they are adapted in a great number of stages in cascade connection, the following equation may represent the frequency response of this connection.

$$F(\omega) = \frac{1}{(1 + j\omega \Delta T)^n} \quad (3)$$

where, $\Delta T$: the time constant of the first order lag element
n: the number of stages in cascade connection In the equation (3), by making the group response delay and the rise time of the filter consistent with the predetermined time $T_2$ and the rise time of the spread $SF_2$ as expressed in the equation (2), respectively, there is attainable a desired function of correction. The step response of the filter 11 as expressed by the equation (3) may be given by the following equation; that is, $$f(t) = 1 - e^{-t/\Delta T} \sum_0^n (t/\Delta T)^n/n! \quad (4)$$

from the equation (4), an approximate value of the group delay time in the stepwise response ($t_{50}$) and an approximate value of rising time ($t_{10-90}$) are obtained as follows:

$$t_{50} \approx n\Delta T \quad (5)$$

$$t_{10-90} \approx \{f'(t)_{max}\}^{-1} = \sqrt{2\pi n} \; \Delta T \quad (6)$$

It is shown that the value $t_{10-90}$ may generally coincide with the reciprocal of the maximum value of the first order differential coefficient of the step response. From this, optimum values of n and $\Delta T$ may be derived as shown in the following equations;

$$n = 2\pi(t_{50}/t_{10-90})^2 \quad (7)$$

$$\Delta T = t^2_{10-90}/2\pi t_{50} \quad (8)$$

Applying to the equations (7) and (8) the group delay time required for a single circulation of the entire primary coolant loop of a typical PWR plant (approx. 10 sec.) and the response spread owing to the effect of agitation as generated during a single circulation of the entire primary coolant loop (an equivalent time constant: approx. 2 sec; in terms of $t_{10-90}$: approx. 4 sec.), the following equations may be obtained; that is, $$n = 2\pi(10/4)^2 \approx 39 \quad (9)$$

$$\Delta T = t^2_{10-90}/2\pi t_{50} = 0.255 \text{ (sec.)} \quad (10)$$

Figure 2:
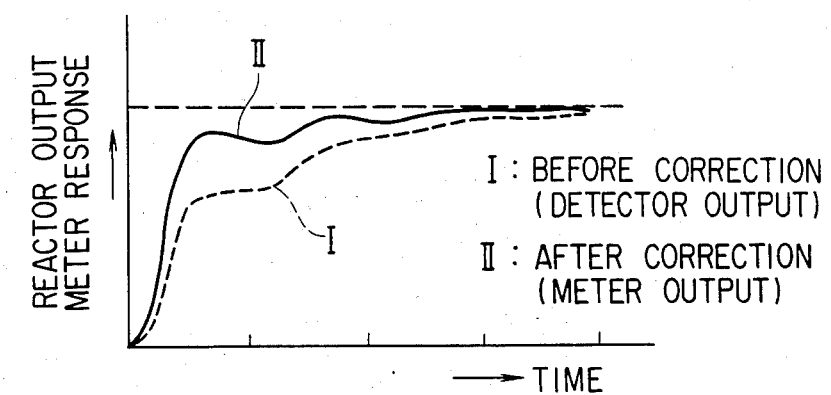
FIG. 2 shows a graphic representation illustrating the simulated result of transient response correction by way of a typical conventional $^{16}$N nuclear reactor output meter.
Figure 3A:
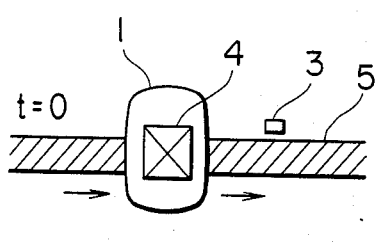
FIGS. 3A through 3E show schematic diagrams and graphic representations illustrating the causes of cumulative transient responses of the $^{16}$N nuclear reactor output meter according to the invention.
Figure 3B:
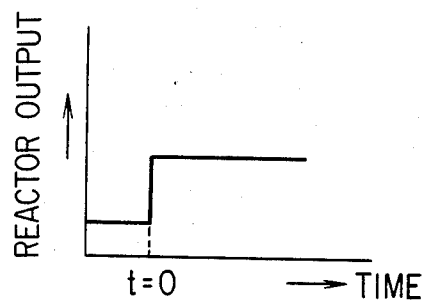
Figure 3C:
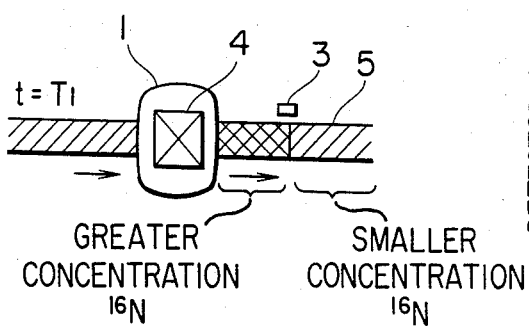
Figure 3D:
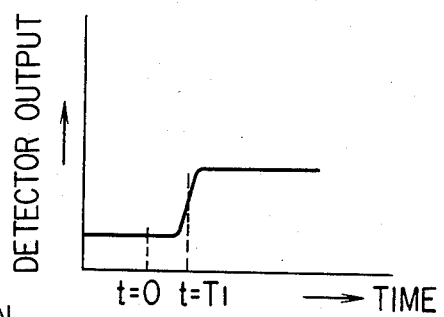
Figure 3E:
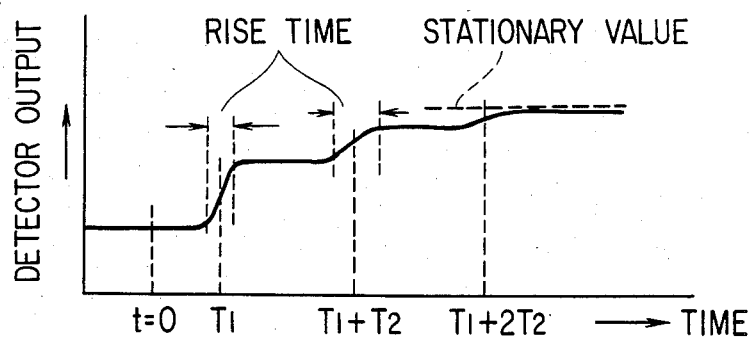
Figure 5:
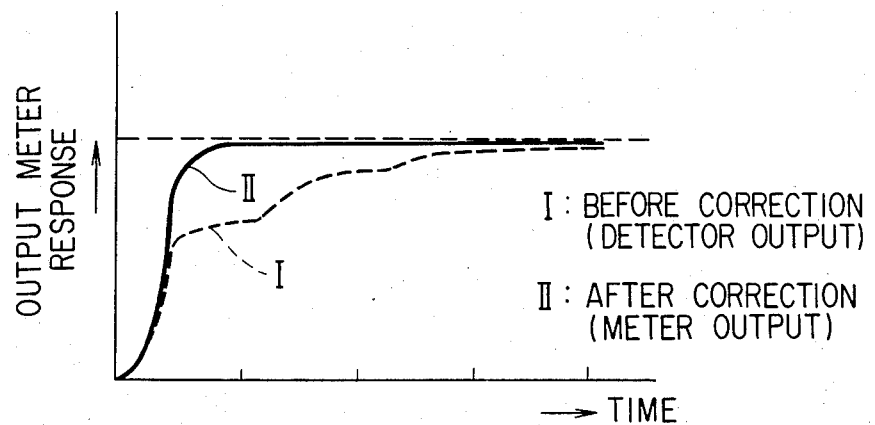
FIG. 5 shows a graphic representation illustrating the simulated result of transient response correction in the $^{16}$N nuclear reactor output meter of the invention.

In FIG. 5, shown is the result of the simulation by using an electronic digital computer on the response correcting function provided when a multi-stage first order lag circuit which meets the conditions of the equations (9) and (10) is incorporated in the circuit arrangement shown in FIG. 4. As is appreciable from the graphic representation of FIG. 5, there is attained a much higher accuracy of correction than a typical example of the prior art shown in FIG. 2. This evidences the fact that this particular approximated normal distribution response type filter can properly satisfy the requirement of response correction for the $^{16}N$ reactor output meter and exhibits an extremely excellent accuracy of correction (approx. 1%) in a specific optimum time constant and an optimum number of stages in cascade connection.

While a great number of stages (in cascade connection) of the first order lag elements are required in the foregoing example of the normal distribution response type filter, it is possible to reduce the number of stages of such elements by allowing a certain degree of ripples in response of the filter within a reasonable limit not sacrificing the required accuracy of correction.

Figure 6:
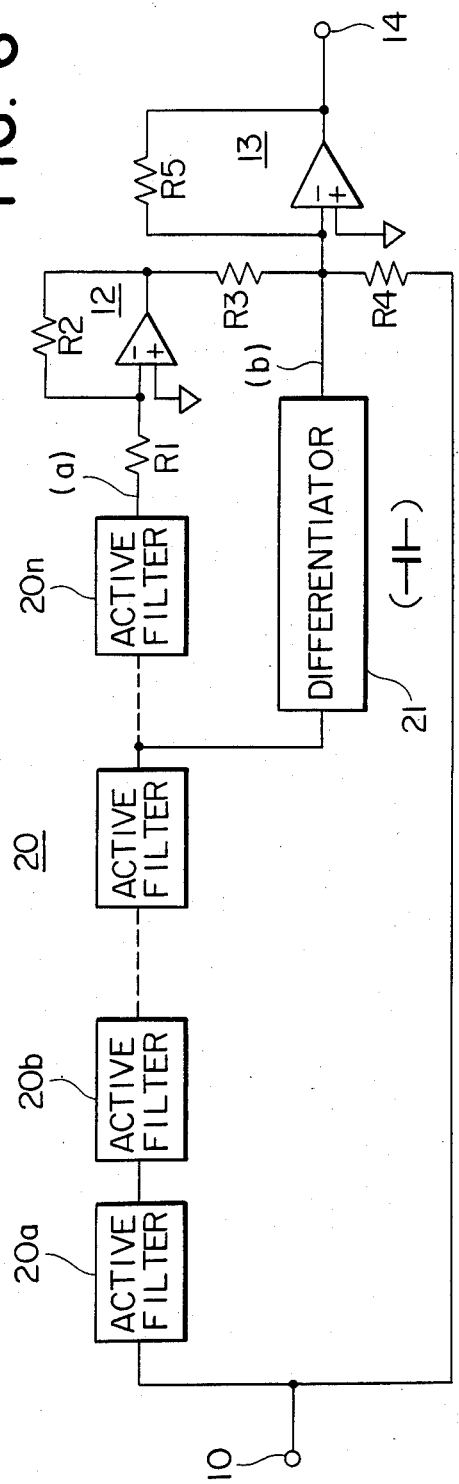
FIG. 6 shows a block diagram of an arrangement of another embodiment of the transient response correction circuit for use in the nuclear reactor output meter of the invention.

FIG. 6 shows a schematic block diagram of an arrangement of another embodiment of the transient response correction circuit to be adapted to the nuclear reactor output meter according to the invention, in which a substantial number of stages of the lag elements incorporated are reduced with the allowance of ripples in the filter response.

It is seen that an approximated normal distribution response type filter 20 comprises a plurality of active filters 20a, 20b, . . . 20n, and a differentiating circuit 21 is also provided. This differentiating circuit 21 may be a capacitor alone, in the case where an amplifier 13 comprises an adder as in this embodiment. These active filters 20a, 20b, . . . 20n are respectively designed to have an intermediate characteristic between the Bessel type (or Thomson type) filter noted above and the Butterworth filter so as to allow several percent of ripples. The differentiating circuit 21 is inserted at a point of circuit where there is a delay time which will be 60 to 90% of the delay time of the entire filter array 20. Numerals R1 through R5 represent resistors.

Figure 7:
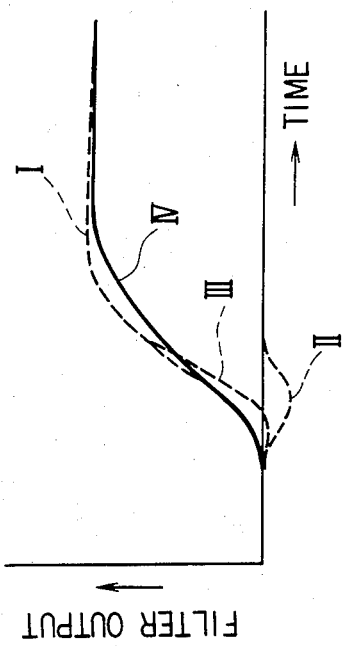
FIG. 7 shows a graphic representation of the operation of the circuit shown in FIG. 6.

FIG. 7 shows a graphic representation of the performance characteristic of the embodiment shown in FIG. 6, in which a dotted line curve I represents the output signal of the active filter 20n, exhibiting a sooner convergence toward a stationary value at the latter half of the rising waveform in comparison with the solid line curve IV by allowing a slight ripple or overshooting waveform. A dotted line curve II represents the output signal of the differentiating circuit 21, and a dotted line curve III indicates how to delay a starting time of the rise by the addition of the dotted curves I and II together. As a consequence, it is possible to reduce the ratio of the rise time ($T_{10-90}$) with respect to the group delay time ($T_{50}$).

Now, referring to the equation (7), it is notable that the embodiment shown in FIG. 4 requires a great number of stages in cascade connection of the lag elements in order to increase the ratio $t_{50}:t_{10-90}$.

It is to be noted that the number of the active filters required for an actual design of the embodiment shown in FIG. 6 wherein the preshooting and overshooting effects of approximately 3% are allowed is four or five. In this case, the type of each active filter is of a third order. With this example, it is to be noted that the accuracy of correction is 2% or less with the employment of four filter elements, which means that there is no practical problem with respect to the accuracy the correction with the decrease of number of stages of the filter elements.

Figure 8:
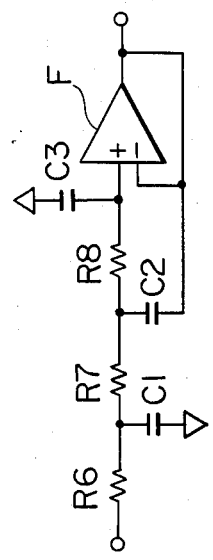
FIG. 8 shows a circuit diagram of an example of a specific construction of a filter shown in FIG. 6.

FIG. 8 shows an example of a basic arrangement of each of the active filters which are employed in the embodiment noted above. In this figure, there are shown an amplifier F, resistors R6 through R8, and capacitors C1 through C3 in circuit.

As seen from the description hereinbefore, it is now made possible by the adoption of an improved response correction circuit according to the present invention to carry out correction of transient responses of a $^{16}$N reactor output meter at an extraordinarily high accuracy by the employment of an analog type electronic arithmetic circuit that has been thought to be difficult to put to practice, which may present a great advantage of adapting the $^{16}$N reactor output meter for the reactor's safeguard system. In addition, the present invention can provide a highly useful nuclear reactor output meter that is advantageous from the aspects of reliability, quick responsiveness and economy in comparison with the conventional correction system using an electronic digital computer, by way of a remarkably simplified analog type electronic arithmetic circuit.

While the present invention has been described in detail by way of specific preferred embodiments thereof, it is to be understood that the present invention is not intended to be restricted to the details of such specific constructions shown in the preferred embodiments, but to contrary, the present invention can of course be practiced in many other ways to an equal advantageous effect in accordance with the foregoing teachings without any retriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A nuclear reactor power meter for measuring the output of a nuclear reactor from the concentration signal of radioisotope $^{16}$N contained in a primary coolant in a primary coolant loop, the nuclear reactor power meter comprising:
   a detector mounted at the outlet of said reactor for detecting gamma rays radiated from said primary coolant flowing therethrough; and
   a transient response correction circuit responsive to the output of said detector and including an approximated normal distribution response filter having a group delay time substantially corresponding to a single circulation time necessary for said primary coolant loop and having a rise time in the step response substantially corresponding to a spread time in the rise of said $^{16}$N concentration signal due to agitation occurring during said single circulation time, said filter comprising multicascaded first order lag elements, the number of the cascaded stages being substantially equal to $2\pi(t/t_{10\text{-}90})^2$, and the time constant of each of said first order lag elements being substantially equal to $\frac{1}{2}\pi(t^2_{10\text{-}90}/t)$ where said circulation time is t and said spread time is $t_{10\text{-}90}$.

2. A nuclear reactor power meter for measuring the output of a nuclear reactor from the concentration signal of radioisotope $^{16}$N contained in a primary coolant in a primary coolant loop, the nuclear reactor power meter comprising:
   a detector mounted at the outlet of said reactor for detecting gamma rays radiated from said primary coolant flowing therethrough;
   a transient response correction circuit responsive to the output of said detector and including an approximated normal distribution response filter having a group delay time substantially corresponding to a single circulation time necessary for said primary coolant loop and having a rise time in the step response substantially corresponding to a spread time in the rise of said $^{16}$N concentration signal due to agitation occurring during said single circulation time, said filter comprising a plurality of active filters, each having a characteristic intermediate between the Bessel type filter and the Butterworth type filter, having an overshooting characteristic of 1%–10% and having an intermediate output terminal providing a delay time of 60%–90% of the entire delay time;
   a differentiator having an input connected to said intermediate output terminal; and
   means for subtracting the output of said differentiator from the output of said filter.

3. A nuclear reactor power meter as claimed in claim 2 further comprising a first amplifier, responsive to the output of said filter, having a gain of the attenuation rate of $^{16}$N occurring during a single circulation of said primary coolant, and a second amplifier, responsive to the outputs of said first amplifier and said detector, having a gain of a normalization coefficient.

4. A nuclear reactor power meter as claimed in claim 3, wherein said means comprises a first amplifier, responsive to the output of said filter, having a gain of the attenuation rate of $^{16}$N occurring during a single circulation of said primary coolant, and a second amplifier, responsive to the outputs of said first amplifier, said differentiator and said detector, having a gain of a normalization coefficient.

5. A nuclear reactor power meter as claimed in claim 3 wherein said second amplifier forms an adder, and said differentiator comprises a capacitor.

* * * * *